United States Patent
Yamamoto et al.

(10) Patent No.: US 11,386,288 B2
(45) Date of Patent: Jul. 12, 2022

(54) MOVEMENT STATE RECOGNITION MODEL TRAINING DEVICE, MOVEMENT STATE RECOGNITION DEVICE, METHODS AND PROGRAMS THEREFOR

(71) Applicant: NIPPON TELEGRAPH AND TELEPHONE CORPORATION, Tokyo (JP)

(72) Inventors: Shuhei Yamamoto, Kanagawa (JP); Hiroyuki Toda, Kanagawa (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 32 days.

(21) Appl. No.: 17/050,742

(22) PCT Filed: Apr. 26, 2019

(86) PCT No.: PCT/JP2019/018004
§ 371 (c)(1),
(2) Date: Oct. 26, 2020

(87) PCT Pub. No.: WO2019/208793
PCT Pub. Date: Oct. 31, 2019

(65) Prior Publication Data
US 2021/0232855 A1    Jul. 29, 2021

(30) Foreign Application Priority Data
Apr. 26, 2018  (JP) .............................. JP2018-085126

(51) Int. Cl.
*G06K 9/62* (2022.01)
*G06N 3/08* (2006.01)
*G06V 20/56* (2022.01)

(52) U.S. Cl.
CPC ......... *G06K 9/6232* (2013.01); *G06K 9/6256* (2013.01); *G06N 3/08* (2013.01); *G06V 20/56* (2022.01)

(58) Field of Classification Search
None
See application file for complete search history.

(56) References Cited

U.S. PATENT DOCUMENTS

| 10,417,781 B1* | 9/2019 | Konolige ............. G06K 9/6271 |
| 2016/0071284 A1* | 3/2016 | Kontschieder ............ G06T 7/20 382/107 |
| 2016/0279501 A1* | 9/2016 | Jang ...................... H04M 1/725 |

FOREIGN PATENT DOCUMENTS

JP        2018-041319 A       3/2018

OTHER PUBLICATIONS

Zheng et al. (2008) "Learning transportation mode from raw GPS data for geographic applications on the web," In Proc of World Wide Web, pp. 247-256.
(Continued)

*Primary Examiner* — Leon Flores

(57) ABSTRACT

A movement state recognition multitask DNN model training section 46 trains a parameter of a DNN model based on an image data time series and a sensor data time series, and based on first annotation data, second annotation data, and third annotation data generated for the image data time series and the sensor data time series. Training is performed such that a movement state recognized by the DNN model in a case in which input with the image data time series and the sensor data time series matches movement states indicated by the first annotation data, the second annotation data, and the third annotation data. This thereby enables information to be efficiently extracted and combined from both video data and sensor data, and also enables movement state
(Continued)

recognition to be implemented with high precision for a data set including data that does not fall in any movement state class.

7 Claims, 19 Drawing Sheets

(56)     References Cited

OTHER PUBLICATIONS

Kwapisz et al. (2010) "Activity Recognition using Cell Phone Accelerometers," SIGKDD Explorations 12:2, pp. 74-82.
Krizhevsky et al. (2012) "ImageNet Classification with Deep Convolutional Neural Networks," Paper, University of Toronto, pp. 1106-1114.
Gers et al. (2002) "Learning precise timing with LSTM recurrent networks," Journal of Machine Learning Research, vol. 3, pp. 115-143.
Song et al. (2016) "Multimodal Multi-Stream Deep Learning for Egocentric Activity Recognition", IEEE Conference on Computer Vision and Pattern Recognition Workshops (CVPRW), IEEE, Jun. 26, 2016 (Jun. 26, 2016), pp. 378-385, XP033027850.

\* cited by examiner

FIG. 3

| DATA ID | VIDEO DATA |
|---|---|
| 1 | COMPRESSED VIDEO FILE e.g. Mpeg4 FORMAT |
| 2 | ⋮ |
| 3 | ⋮ |
| 4 | ⋮ |
| 5 | ⋮ |
| 6 | ⋮ |

FIG. 4

| SERIES ID | DATA ID | DATE-TIME | LATITUDE | LONGITUDE | X AXIS ACCELERATION (m/s²) | Y AXIS ACCELERATION (m/s²) |
|---|---|---|---|---|---|---|
| 1 | 1 | 2016-6-20-12:00 | 35.511244 | 135.668943 | 1 | 0.1 |
| 2 | 1 | 2016-6-20-12:10 | 35.511223 | 135.667654 | 3 | 0.2 |
| 3 | 1 | 2016-6-20-12:20 | 35.512344 | 135.665643 | 4 | 0.1 |
| 4 | 1 | 2016-6-20-12:30 | 35.511314 | 134.664444 | 2 | 0.3 |
| 5 | 2 | 2016-6-20-12:00 | 35.511244 | 135.668943 | 10 | 0.1 |
| 6 | 2 | 2016-6-20-12:00 | 35.511244 | 135.668943 | 8 | 0.2 |
| ⋮ | ⋮ | ⋮ | ⋮ | ⋮ | ⋮ | ⋮ |

FIG. 5

| DATA ID | ANNOTATION NAME |
|---|---|
| 1 | MISCELLANEOUS-OTHER |
| 2 | VEHICLE NEAR MISS |
| 3 | BICYCLE NEAR MISS |
| 4 | MOTORBIKE NEAR MISS |
| 5 | ... |
| 6 | ... |

FIG.10

| DATA ID | FIRST ANNOTATION DATA | SECOND ANNOTATION DATA | THIRD ANNOTATION DATA |
|---|---|---|---|
| 1 | MISCELLANEOUS-OTHER | | MISCELLANEOUS-OTHER |
| 2 | NEAR MISS | VEHICLE NEAR MISS | VEHICLE NEAR MISS |
| 3 | NEAR MISS | BICYCLE NEAR MISS | BICYCLE NEAR MISS |
| 4 | NEAR MISS | MOTORBIKE NEAR MISS | MOTORBIKE NEAR MISS |
| 5 | ... | ... | ... |
| 6 | ... | ... | ... |

FIG.14

| PARAMETER NAME | PARAMETER VALUE |
|---|---|
| CONVOLUTIONAL LAYER | [0.1 ... 0.3; ... ⋱ ...; 0.2 ... 0.1] |
| FULLY CONNECTED LAYER A | [0.1 ... 0.3; ... ⋱ ...; 0.2 ... 0.1] |
| FULLY CONNECTED LAYER B | [0.1 ... 0.3; ... ⋱ ...; 0.2 ... 0.1] |
| LSTM | [0.1 ... 0.3; ... ⋱ ...; 0.2 ... 0.1] |

| PARAMETER NAME | PARAMETER VALUE |
|---|---|
| FULLY CONNECTED LAYER C | [0.1 ... 0.3; ... ⋱ ...; 0.2 ... 0.1] |
| FULLY CONNECTED LAYER D | [0.1 ... 0.3; ... ⋱ ...; 0.2 ... 0.1] |
| OUTPUT LAYER 1 (SCALER) | {"NEAR MISS OR NOT"} |
| OUTPUT LAYER 2 (VECTOR) | {1:"VEHICLE NEAR MISS", 2:"BICYCLE NEAR MISS", 3:"MOTORBIKE NEAR MISS", ...} |
| OUTPUT LAYER 3 (VECTOR) | {1:"MISCELLANEOUS-OTHER", 2:"VEHICLE NEAR MISS", 3:"BICYCLE NEAR MISS", 4:"MOTORBIKE NEAR MISS", ...} |

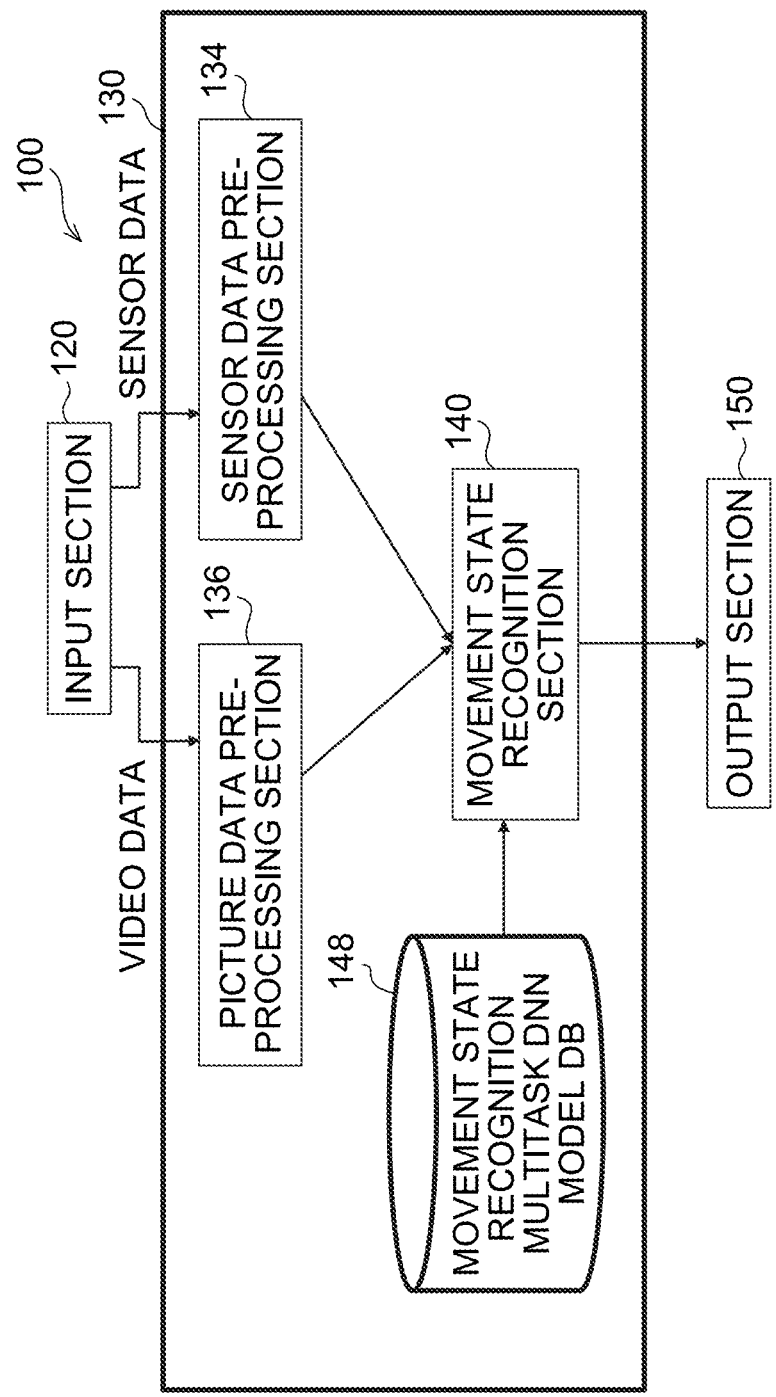

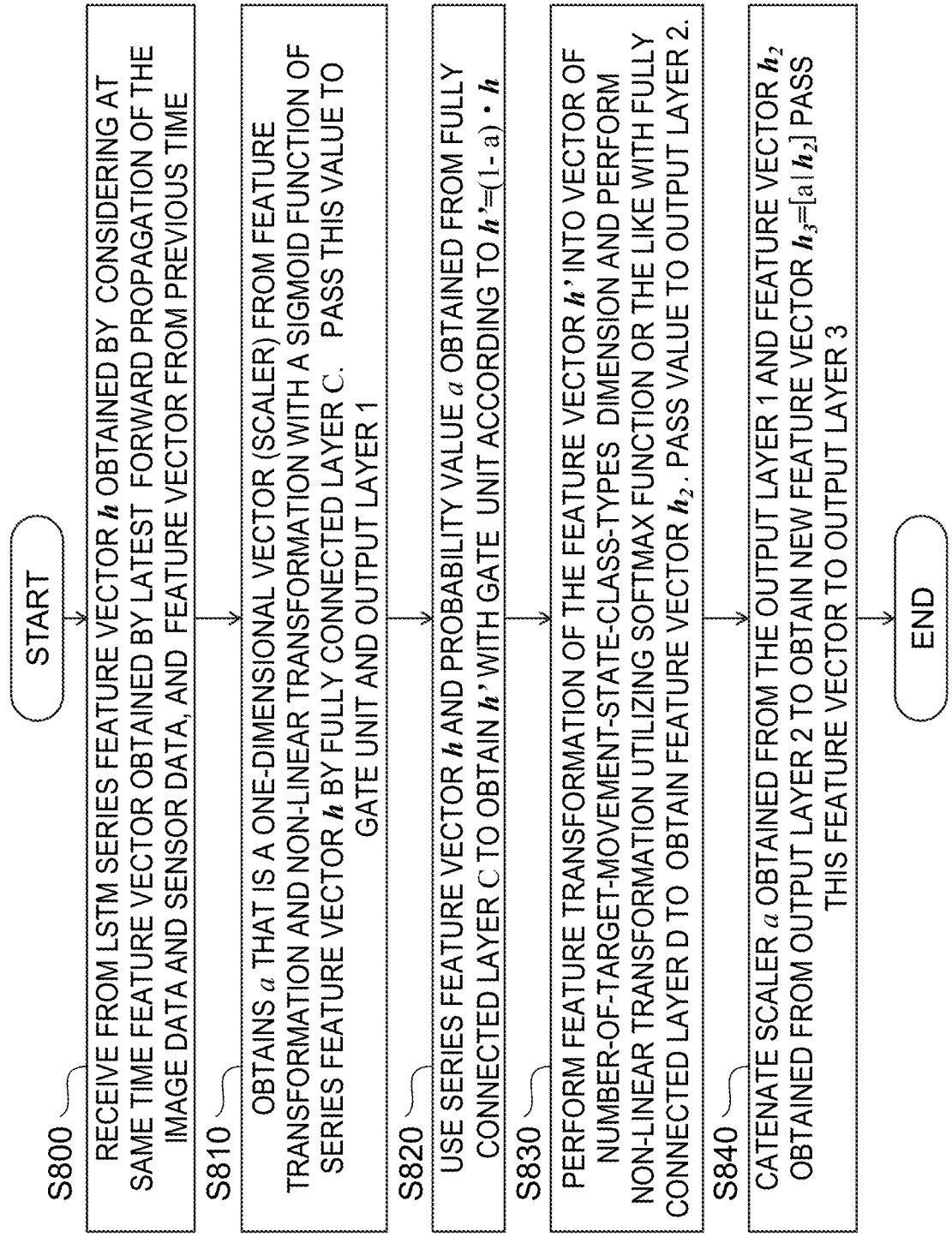

MOVEMENT STATE RECOGNITION MODEL TRAINING DEVICE, MOVEMENT STATE RECOGNITION DEVICE, METHODS AND PROGRAMS THEREFOR

CROSS-REFERENCE TO RELATED APPLICATIONS

This application is a U.S. 371 Application of International Patent Application No. PCT/JP2019/018004, filed on 26 Apr. 2019, which application claims priority to and the benefit of JP Application No. 2018-085126, filed on 26 Apr. 2018, the disclosures of which are hereby incorporated herein by reference in their entireties.

TECHNICAL FIELD

The present invention relates to a movement state recognition model training device, a movement state recognition device, methods and programs therefor. In particular the present invention relates to a movement state recognition model training device, a movement state recognition device, and methods and programs therefor for automatically recognizing the movement state of a user from video and sensor data acquired by the user.

BACKGROUND ART

Accompanying more compact video imaging devices and power reductions in GPS and gyro sensors, it is now easy to record movements of a user as videos, position information, and various data such as acceleration, and the like. Detailed analysis of user movements from the data is proving useful in various applications. For example, utilizing first-person perspective video acquired through eyewear etc., and acceleration data etc. acquired with wearable sensors, to automatically recognize and analyze states such as a window shopping state and a state of crossing on a pedestrian crossing, is useful in various applications such as personalization of services.

Hitherto, technology to automatically recognize a movement state of a user from sensor information includes technology to estimate a transportation mode of a user from GPS position information and acceleration information (Zheng, Y., Liu, L., Wang, L., and Xie, X.: Learning transportation mode from raw GPS data for geographic applications on the web. In Proc. of World Wide Web 2008, pp. 247-256, 2008.) Moreover, there are initiatives to develop technology that uses information such as acceleration acquired from a smartphone to analyze walking and jogging, climbing and descending stairs, and the like (Jennifer R. Kwapisz, Gary M. Weiss, Samuel A. Moore: Activity Recognition using Cell Phone Accelerometers, Proc. of Sensor KDD 2010.)

SUMMARY OF INVENTION

Technical Problem

However, since it is only sensor information that has been utilized in the above methods hitherto, user movement state recognition has not yet been able to be performed that considers video information. For example, in situations in which there is a desire to ascertain a movement state of a user from wearable sensors data, even though the action of walking can be identified, from the sensor data alone it is difficult to automatically recognize a detailed user state, such as a window shopping state, or a state of crossing at a pedestrian crossing. Moreover, even if inputs of video data and sensor data are combined and a simple classification model is employed, such as a support vector machine (SVM) that is one type of machine learning technology, it is still difficult to recognize movement state with high precision due to the levels of abstraction of information differing between the video data and the sensor data. Moreover, depending on the input data, there might also be data present for a movement state that is not expected as a recognition target (i.e. for which none of the classification classes applies). For example, in the example of a wearable sensor described above, there might be data for a scene differing from the target behaviors for recognition, such as in stay-at-home situations or the like. An approach to appropriately classify such data that might be considered is to add to the set of movement state classes one more class (for example "miscellaneous-other") for data for which none of the classification classes applies. However, since the data for such a "miscellaneous-other" class has a tendency to have a greater number of instances than other movement state classes and there is a wide range of data treated as being in the "miscellaneous-other" class, it should be expected that in unknown data there might also be many patterns present that are not patterns labeled in training data, and such data would not be appropriately classifiable.

In consideration of the above circumstances, an object of the present invention is to provide a movement state recognition model training device, method, and program capable of efficiently extracting and combining information from both video data and sensor data, and implementing movement state recognition with high precision for a data set including data not corresponding to any one of movement state classes.

Moreover, another object is to provide a movement state recognition device, method, and program capable of recognizing a movement state at high precision from both video data and sensor data.

Solution to Problem

A movement state recognition model training device according to a first aspect is configured to train a deep neural network (DNN) model that is input with a time series of image data of a camera mounted to a moving body and a time series of sensor data of a sensor mounted to the moving body, that extracts respective image data features and respective sensor data features, and that recognizes a movement state of the moving body from data abstracted from the respective image data features and respective sensor data features. The movement state recognition model training device is configured including an annotation label rearranging section and a movement state recognition multitask DNN training section. The annotation label rearranging section is configured to generate first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, based on annotation data indicating a pre-appended movement state for the image data time series and the sensor data time series. The movement state recognition multitask DNN training section is configured to train a parameter of the DNN model based on the image data time series and the sensor data time series and on the first annotation data, the second annotation data, and the third annotation data generated for the image data time series and the sensor data time series, by training such that a movement state recognized by the DNN model in a case in which input with the image data time series and the sensor data time series matches movement states indicated by the first annotation data, the second annotation data, and the third annotation data.

A movement state recognition model training method of a second aspect is a movement state recognition model training method in a movement state recognition model training device for training a deep neural network (DNN) model that is input with a time series of image data of a camera mounted to a moving body and a time series of sensor data of a sensor mounted to the moving body, that extracts respective image data features and respective sensor data features, and that recognizes a movement state of the moving body from data abstracted from the respective image data features and respective sensor data features. An annotation label rearranging section generates first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, based on annotation data indicating a pre-appended movement state for the image data time series and the sensor data time series. A movement state recognition multitask DNN training section trains a parameter of the DNN model based on the image data time series and the sensor data time series and on the first annotation data, the second annotation data, and the third annotation data generated for the image data time series and the sensor data time series, by training such that a movement state recognized by the DNN model in a case in which input with the image data time series and the sensor data time series matches movement states indicated by the first annotation data, the second annotation data, and the third annotation data.

A movement state recognition device of a third aspect is a movement state recognition device including a movement state recognition section. The movement state recognition section recognizes a movement state of a moving body of a recognition subject by inputting a time series of image data of a camera mounted to the moving body and a time series of sensor data of a sensor mounted to the moving body into a deep neural network (DNN) model that has been pre-trained to use the image data time series and the sensor data time series as input, to extract respective image data features and respective sensor data features, and to recognize a movement state of the moving body from data abstracted from the respective image data features and respective sensor data features. The DNN model is pre-trained based on first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, that are generated from annotation data indicating a pre-appended movement state for the image data time series and the sensor data time series, and based on the image data time series and the sensor data time series, by training such that a movement state recognized by the DNN model in a case in which input with the image data time series and the sensor data time series matches movement states indicated by the first annotation data, the second annotation data, and the third annotation data.

A movement state recognition method according to a fourth aspect is a movement state recognition method for recognizing a movement state of a moving body of a recognition subject by a movement state recognition section inputting a time series of image data of a camera mounted to the moving body and a time series of sensor data of a sensor mounted to the moving body into a deep neural network (DNN) model that has been pre-trained to use the image data time series and the sensor data time series as input, to extract respective image data features and respective sensor data features, and to recognize a movement state of the moving body from data abstracted from the respective image data features and respective sensor data features. The DNN model is pre-trained based on first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, that are generated from annotation data indicating a pre-appended movement state for the image data time series and the sensor data time series, and based on the image data time series and the sensor data time series, by training such that a movement state recognized by the DNN model in a case in which input with the image data time series and the sensor data time series matches movement states indicated by the first annotation data, the second annotation data, and the third annotation data.

A program according to a fifth aspect is a program to cause a computer to execute movement state recognition model training processing for training a deep neural network (DNN) model that is input with a time series of image data of a camera mounted to a moving body and a time series of sensor data of a sensor mounted to the moving body, that extracts respective image data features and respective sensor data features, and that recognizes a movement state of the moving body from data abstracted from the respective image data features and respective sensor data features. The movement state recognition model training processing includes: generating first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, based on annotation data indicating a pre-appended movement state for the image data time series and the sensor data time series; and training a parameter of the DNN model based on the image data time series and the sensor data time series and on the first annotation data, the second annotation data, and the third annotation data generated for the image data time series and the sensor data time series, by training such that a movement state recognized by the DNN model in a case in which input with the image data time series and the sensor data time series matches movement states indicated by the first annotation data, the second annotation data, and the third annotation data.

A program according to a sixth aspect is a program to cause a computer to execute movement state recognition processing including: recognizing a movement state of a moving body of a recognition subject by inputting a time series of image data of a camera mounted to the moving body and a time series of sensor data of a sensor mounted to the moving body into a deep neural network (DNN) model that has been pre-trained to use the image data time series and the sensor data time series as input, to extract respective image data features and respective sensor data features, and to recognize a movement state of the moving body from data abstracted from the respective image data features and respective sensor data features. The DNN model is pre-trained based on first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, that are generated from annotation data indicating a pre-appended movement state for the image data time series and the sensor data time series, and based on the image data time series and the sensor data time series, by training such that a movement state recognized by the DNN model in a case in which input with the image data time series and the sensor data time series matches movement states indicated by the first annotation data, the second annotation data, and the third annotation data.

Advantageous Effects of Invention

The movement state recognition model training device, method, and program according to an aspect of the present invention trains the parameter of the DNN model based on the time series of image data and the time series of sensor data, and based on the first annotation data, second annotation data, and third annotation data generated for the image data time series and the sensor data time series. The parameter is trained such that the movement state recognized by the DNN model in a case in which input with the image data time series and the sensor data time series matches the movement states indicated by the first annotation data, second annotation data, and third annotation data. This thereby achieves the advantageous effect of enabling information to be efficiently extracted and combined from both video data and sensor data, and enabling movement state recognition to be implemented with high precision for a data set including data that does not fall in any of the movement state classes.

Moreover, the movement state recognition device, method, and program achieve the advantageous effect of enabling movement state recognition to be implemented with high precision from both image data and sensor data.

BRIEF DESCRIPTION OF DRAWINGS

FIG. 3 is a diagram illustrating an example of a storage format in a video data DB.

FIG. 4 is a diagram illustrating an example of a storage format in a sensor data DB.

FIG. 5 is a diagram illustrating an example of a storage format in an annotation DB.

FIG. 10 is a diagram illustrating an example of annotation data for plural patterns.

FIG. 14 is a diagram illustrating an example of a storage format in a movement state recognition multitask DNN model DB.

FIG. 15 is a block diagram illustrating a configuration of a movement state recognition device according to an exemplary embodiment of the present invention.

FIG. 18 flowchart illustrating flow of feedforward in a multitask DNN section in processing of a movement state recognition section of a movement state recognition device according to an exemplary embodiment of the present invention.

DESCRIPTION OF EMBODIMENTS

Detailed description follows regarding an exemplary embodiment of the present invention, with reference to the drawings. Note that for the exemplary embodiment of the present invention, an example will be described of a case in which the present invention is applied to a movement state recognition model training device corresponding to a training phase, and to a movement state recognition device corresponding to a recognition phase.

Figure 1A:
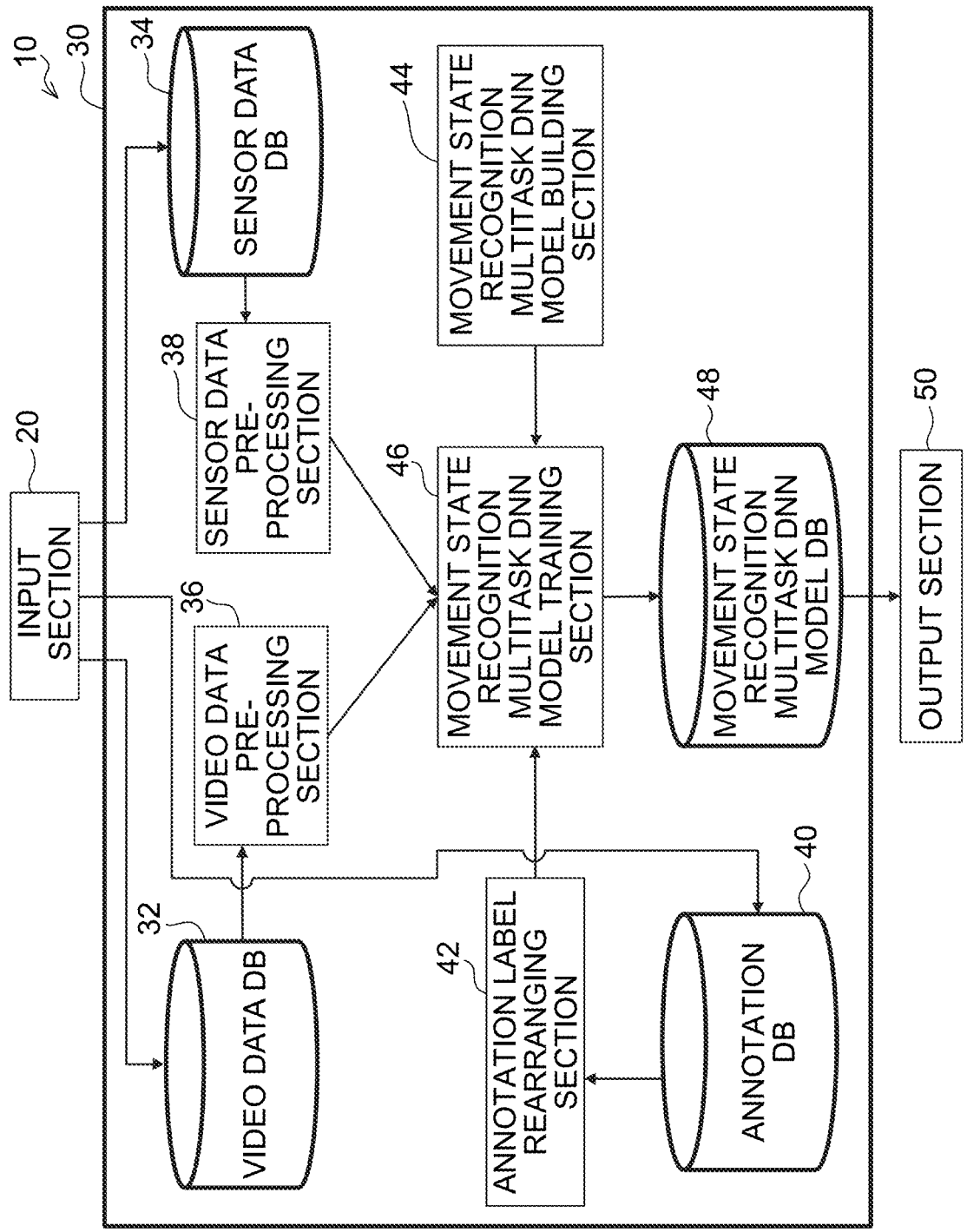
FIG. 1A is a block diagram illustrating a configuration of a movement state recognition model training device according to an exemplary embodiment of the present invention.

Configuration of Movement State Recognition Model Training Device According to Exemplary Embodiment of Present Invention First description follows regarding a configuration of a movement state recognition model training device according to an exemplary embodiment of the present invention. As illustrated in FIG. 1A, a movement state recognition model training device 10 according to an exemplary embodiment of the present invention includes an input section 20, a computation section 30, and an output section 50.

The computation section 30 includes a video data DB 32, a sensor data DB 34, a video data pre-processing section 36, a sensor data pre-processing section 38, an annotation DB 40, an annotation label rearranging section 42, a movement state recognition multitask DNN model building section 44, a movement state recognition multitask DNN model training section 46, and a movement state recognition multitask DNN model DB 48. The computation section 30 utilizes information in each of the DBs to output a movement state recognition multitask DNN model to the output section 50. The video data DB 32 and the sensor data DB 34 are built in advance so as to be able to associate a time series of sensor data against video data related by data ID. The build processing for the video data DB 32 and the sensor data DB 34 is achieved, for example, by the input section 20 receiving pairs of video data and sensor data time series input by a system provider. This may be achieved by the input section 20 appending an ID uniquely identifying each pair to the pairs of input video data and sensor data as a data ID, and storing the appended data in the video data DB 32 and the sensor data DB 34. An annotation name is also stored in the annotation DB 40 for each of the data IDs. The annotation referred to here is presumed, for example, to describe a movement state for first-person perspective video data acquired with eyewear. Window shopping, crossing a pedestrian crossing, or the like are examples thereof. The processing to build the annotation DB 40 is also similar to the build processing of the video data DB 32 and the sensor data DB 34, and may, for example, be achieved by the input section 20 receiving an annotation for each of the data IDs input by the system provider, so that the input result is stored in the DB.

In the exemplary embodiment of the present invention, the operations of the configuration elements illustrated in FIG. 1A are built as a program, and are installed on, and executed by, a computer employed as the movement state recognition model training device.

The video data pre-processing section 36 performs sampling and normalization on a time series of image data expressing the video data stored in the video data DB 32.

The sensor data pre-processing section 38 performs normalization and feature vectorization on the sensor data time series stored in the sensor data DB 34.

Based on the annotation data indicating a movement state pre-appended against the image data time series and the sensor data time series, the annotation label rearranging section 42 generates: first annotation data indicating whether or not one of plural predetermined movement state classes applies; second annotation data indicating which of the plurality of predetermined movement state classes corresponds to the movement state of the moving body; and third annotation data indicating which of the plurality of predetermined movement state classes and a miscellaneous-other movement state class corresponds to the movement state of the moving body.

The movement state recognition multitask DNN model building section 44 takes in input of the image data time series and the sensor data time series, extracts respective features of the image data and respective features of the sensor data, and builds a DNN model for recognizing movement state from data resulting from abstracting the respective features of the image data and the respective features of the sensor data. The DNN model includes an output layer to output a recognition result indicating whether or not one of the plural movement state classes applies, an output layer to output a recognition result indicating which out of the plural movement state classes, and an output layer to output a recognition result indicating which out of the plural predetermined movement state classes and the miscellaneous-other movement state class.

The movement state recognition multitask DNN model training section 46 trains parameters of the DNN model. This training is based on the image data time series resulting from processing by the video data pre-processing section 36, the sensor data time series resulting from processing by the sensor data pre-processing section 38, and based on the first annotation data, the second annotation data, and the third annotation data that have been generated for the image data time series and the sensor data time series. When doing so, the movement state recognition multitask DNN model training section 46 trains the parameters of the DNN model so that the movement state recognized by the DNN model in a case in which input with the image data time series and the sensor data time series, matches the movement states indicated by the first annotation data, the second annotation data, and the third annotation data. The trained DNN model parameters are stored in the movement state recognition multitask DNN model DB 48.

Figure 1B:
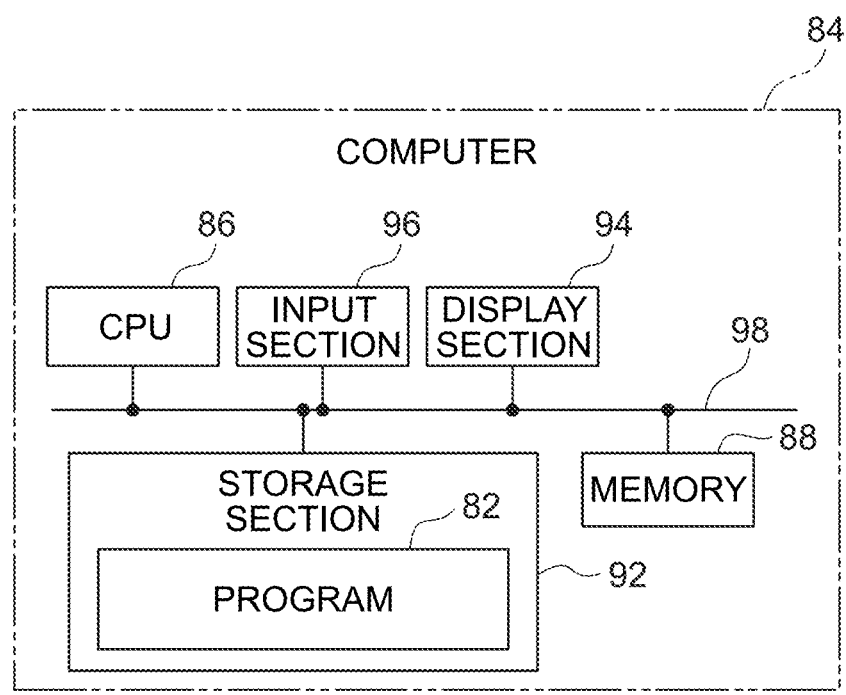
FIG. 1B is a schematic block diagram of an example of a computer to function as a movement state recognition model training device and a movement state recognition device.

The movement state recognition model training device 10 is, as an example, implemented by a computer 84 configured as illustrated in FIG. 1B. The computer 84 includes a central processing unit (CPU) 86, a memory 88, a storage section 92 stored with a program 82, a display section 94 including a monitor, and an input section 96 including a keyboard and a mouse. The CPU 86 is an example of a hardware processor. The CPU 86, the memory 88, the storage section 92, the display section 94, and the input section 96 are mutually connected together by a bus 98.

The storage section 92 is implemented by a hard disk drive (HDD), a solid state drive (SSD), flash memory, or the like. The program 82 to cause the computer 84 to function as the movement state recognition model training device 10 is stored in the storage section 92. The data input by the input section 96, and intermediate data and the like arising while executing the program 82, are stored in the storage section 92. The CPU 86 reads the program 82 from the storage section 92, expands the program 82 into the memory 88, and executes the program 82. Note that the program 82 may be provided stored on a computer readable medium.

Figure 2:
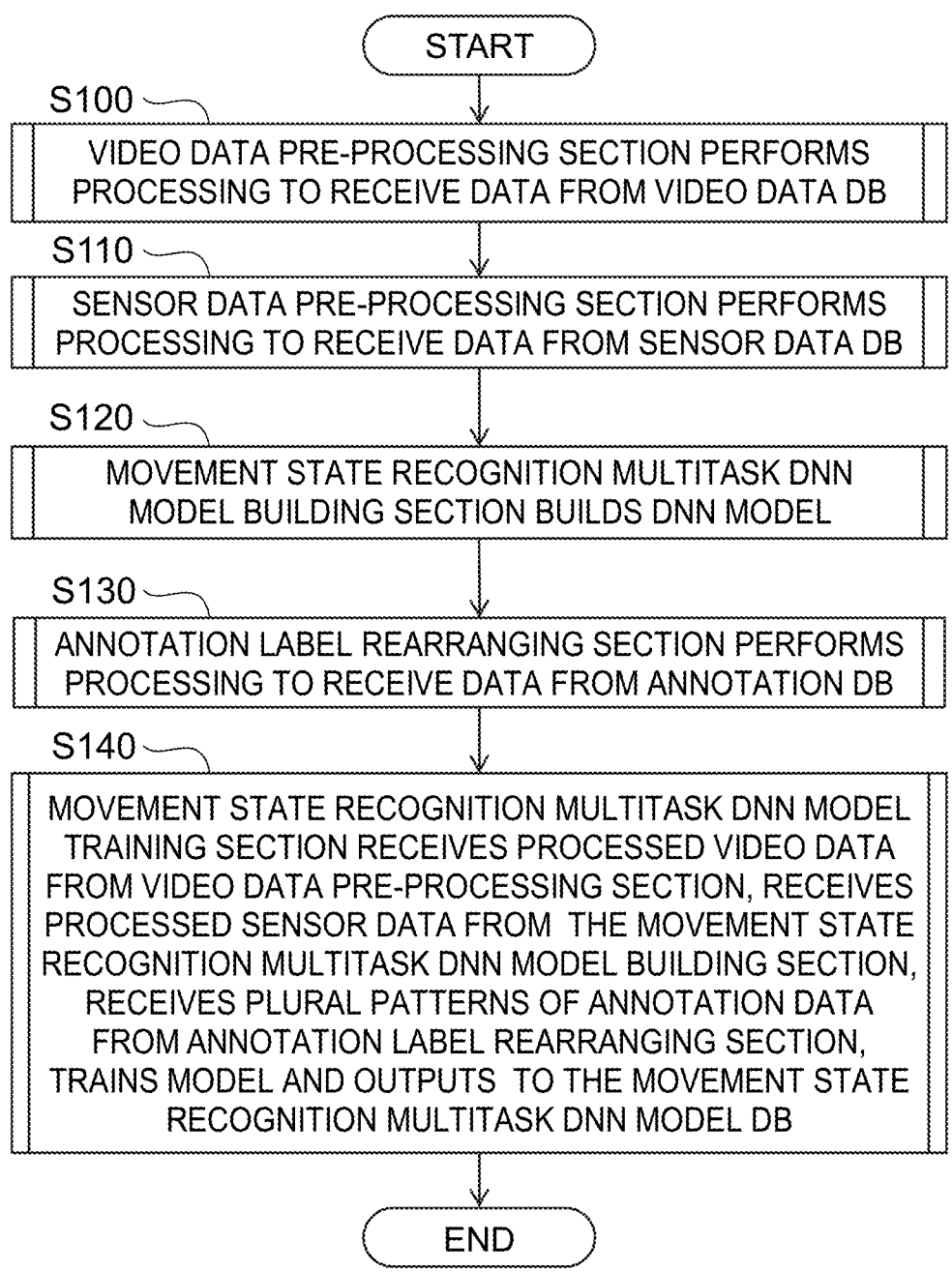
FIG. 2 is a flowchart illustrating a flow of processing in a movement state recognition model training device according to an exemplary embodiment of the present invention.

Operation of Movement State Recognition Model Training Device According to Exemplary Embodiment of Present Invention FIG. 2 is a flowchart of a model training processing routine executed by the movement state recognition model training device 10 of an exemplary embodiment of the present invention. More specific description follows.

Model Training Processing Routine

At step S100, the video data pre-processing section 36 receives data from the video data DB 32 and performs processing. Detailed description of this processing is described below. An example of a storage format of the data in the video data DB 32 is illustrated in FIG. 3. The video data are stored as compressed file using Mpeg4 format or the like, and are associated with data IDs in order to make associations with the sensor data as described above. Moreover, the video data are first-person perspective video data acquired through eyewear or the like worn by a user, who is an example of a moving body.

At step S110, the sensor data pre-processing section 38 receives data from the sensor data DB 34 and performs processing. Detailed description of this processing is described below. FIG. 4 illustrates an example of a storage format of data in the sensor data DB 34. The sensor data includes elements such as date-time, longitude-latitude, X-axis acceleration, Y-axis acceleration, and the like. Each of the sensor data has a unique series ID. Furthermore, a data ID is held in order to make associations with the video data as described above. The sensor data are data acquired using wearable sensors worn by a user.

At step S120, the movement state recognition multitask DNN model building section 44 builds a DNN model. Detailed description of this processing is described below.

At step S130, the annotation label rearranging section 42 receives data from the annotation DB 40 and performs processing. Detailed description of this processing is described below. An example of a storage format of data in the annotation DB 40 is illustrated in FIG. 5.

At step S140, the movement state recognition multitask DNN model training section 46 receives processed video data from the video data pre-processing section 36, and receives processed sensor data from the sensor data pre-processing section 38. The movement state recognition multitask DNN model training section 46 also receives the DNN model from the movement state recognition multitask DNN model building section 44, receives plural patterns of annotation data from the annotation label rearranging section 42. The movement state recognition multitask DNN model training section 46 then trains the parameters of the DNN model and outputs to the movement state recognition multitask DNN model DB 48.

Figure 6:
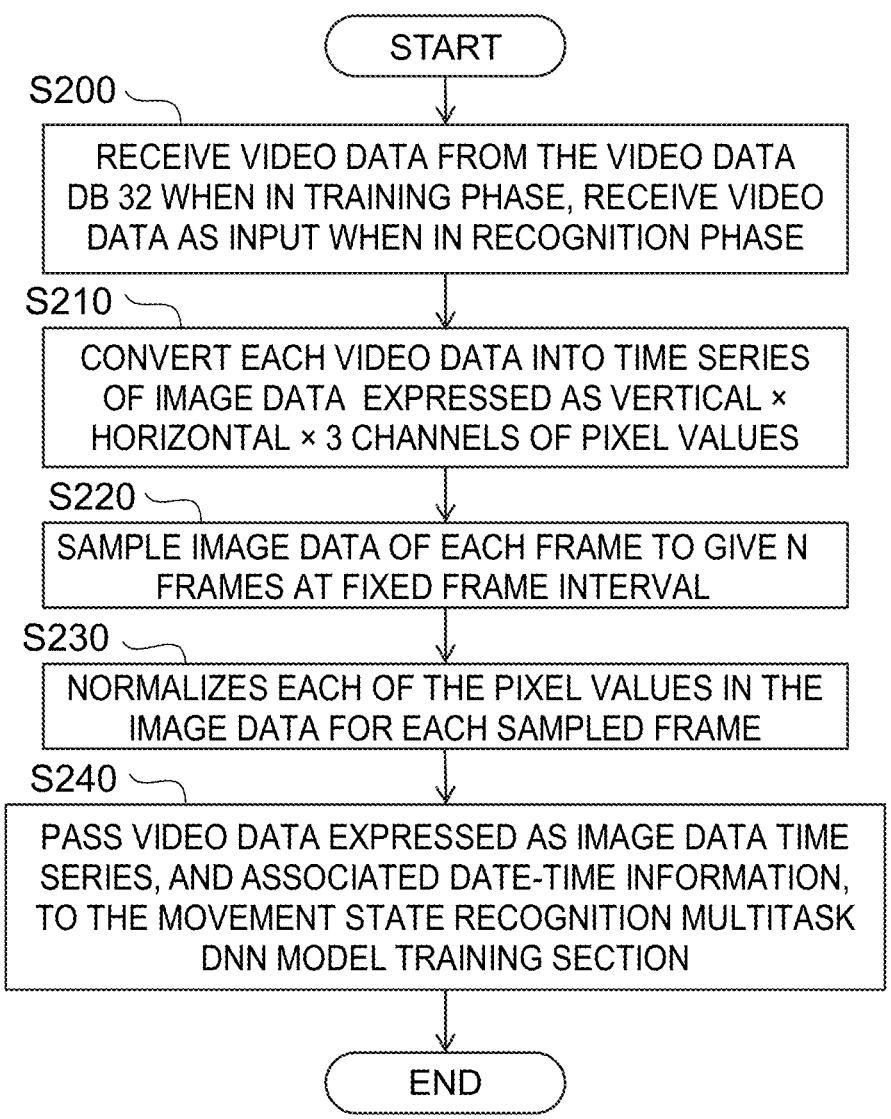
FIG. 6 is a flowchart illustrating a flow of processing of a video data pre-processing section of a movement state recognition model training device according to an exemplary embodiment of the present invention.

FIG. 6 is a flowchart illustrating a sub-routine executed by the video data pre-processing section 36 in order to implement step S100. More specific description follows.

At step S200, the video data pre-processing section 36 receives video data from the video data DB 32.

Figure 7:
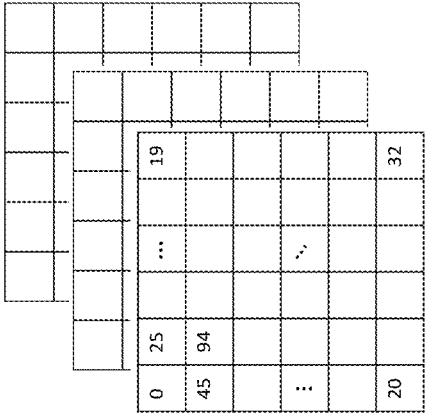
FIG. 7 is a diagram illustrating an example of an image data time series generated from video data by a video data pre-processing section.

At step S210, the video data pre-processing section 36 converts each video data into a time series of image data expressed as pixel values that are vertical×horizontal×3 channels of pixel values. For example, the vertical size is decided so as to be 100 pixels, and the horizontal size is decided so as to be 200 pixels. FIG. 7 illustrates an example of a time series of image data generated from the video data. Each item of image data holds a data ID associated with the origin image data, a number for each frame, and time stamp information.

At step S220, the video data pre-processing section 36 samples N frames at a fixed frame interval from the image data time series in order to reduce redundant data.

At step S230, the video data pre-processing section 36 normalizes each of the pixel values in the image data for each sampled frame in order to facilitate image data handling by the DNN model. For example, each of the pixel values is divided by the maximum possible value taken by the pixels in order to set a range of pixel values from 0 to 1.

At step S240, the video data pre-processing section 36 passes the video data expressed by the image data time series, and the associated date-time information, to the movement state recognition multitask DNN model training section 46.

Figure 8:
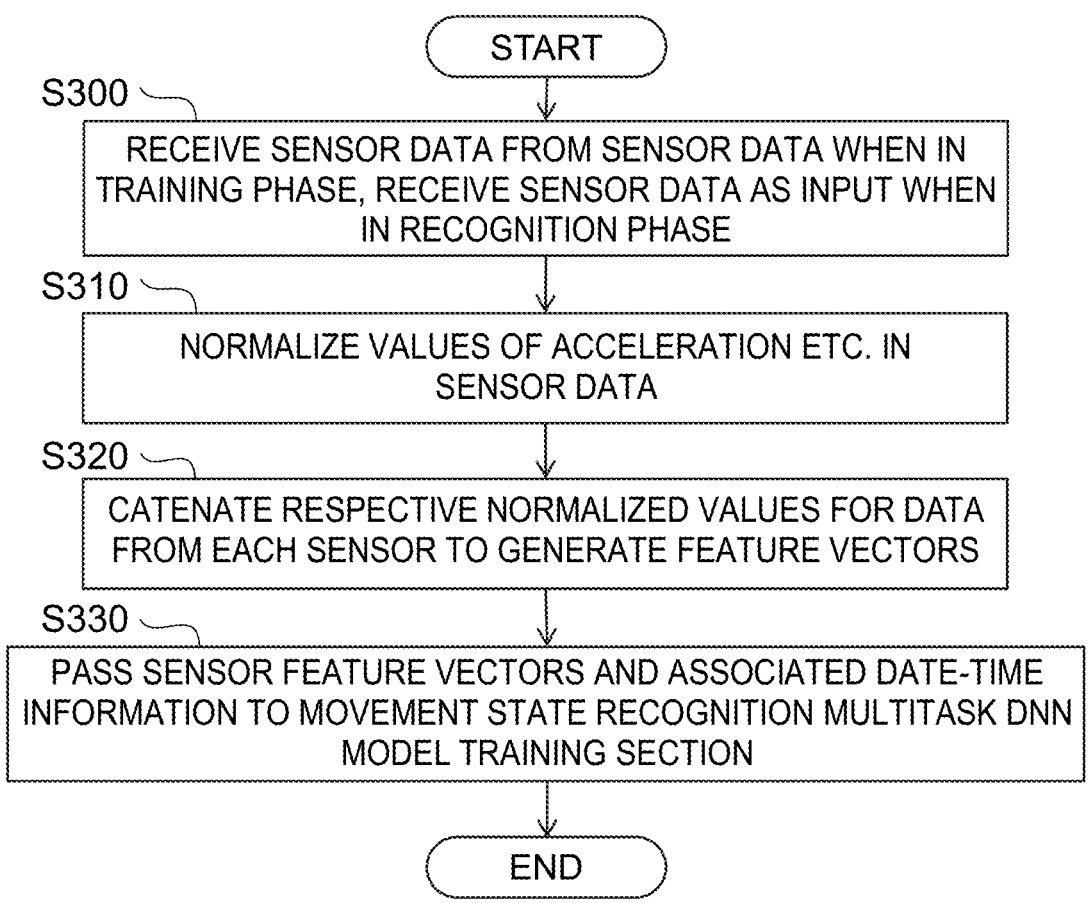
FIG. 8 is a flowchart illustrating a flow of processing of a sensor data pre-processing section of a movement state recognition model training device according to an exemplary embodiment of the present invention.

FIG. 8 is a flowchart illustrating a sub-routine executed by the sensor data pre-processing section 38 in order to implement step S110.

At step S300, the sensor data pre-processing section 38 receives the sensor data from the sensor data DB 34.

At step S310, the sensor data pre-processing section 38 normalizes the values of acceleration etc. in the sensor data in order to facilitate sensor data handling by the DNN model. For example, canonicalization is performed such that the overall average value of sensor data is 0, and such that the standard deviation thereof is 1.

At step S320, the sensor data pre-processing section 38 catenates the respective normalized values for data from each sensor to generate feature vectors.

At step S330, the sensor data pre-processing section 38 passes the sensor feature vectors and associated date-time information to the movement state recognition multitask DNN model training section 46.

Figure 9:
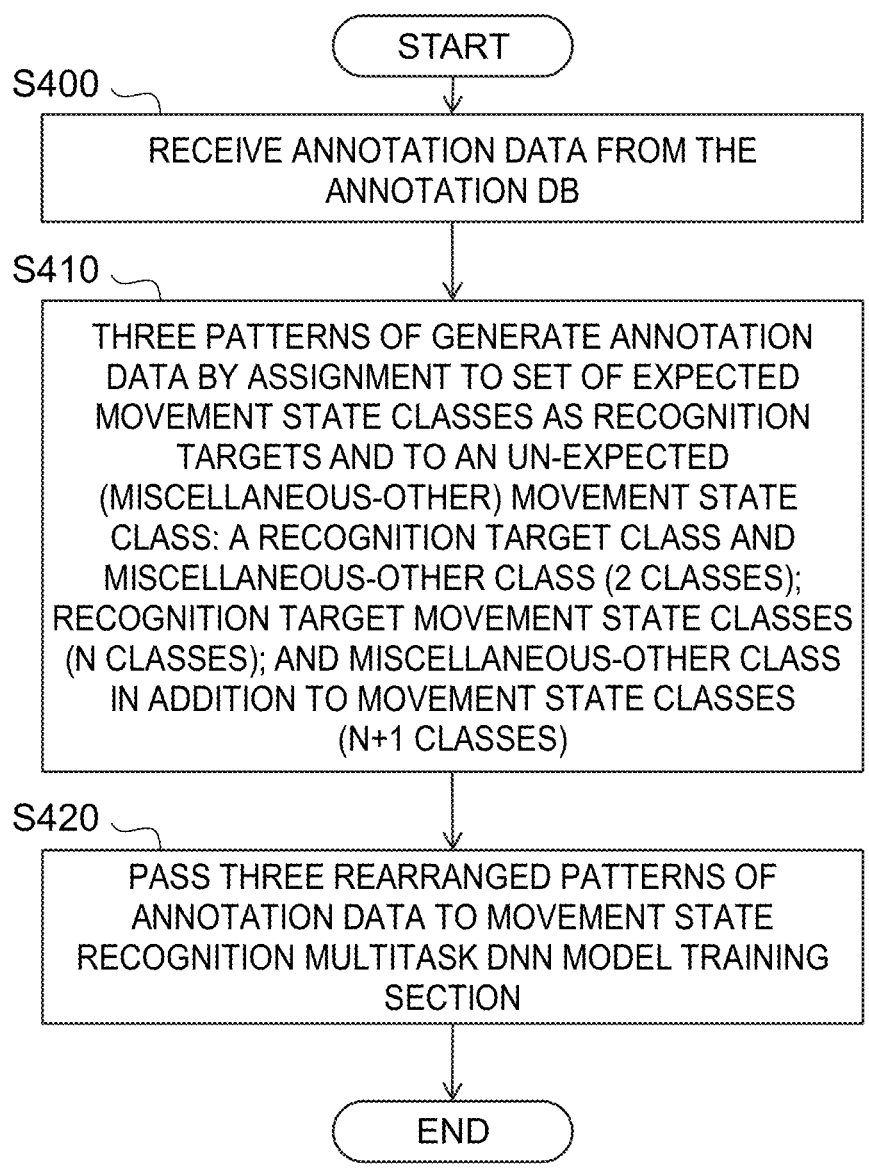
FIG. 9 is a flowchart illustrating a flow of processing of an annotation label rearranging section of a movement state recognition model training device according to an exemplary embodiment of the present invention.

FIG. 9 is a flowchart for the annotation label rearranging section 42 in an exemplary embodiment of the present invention.

At step S400, the annotation label rearranging section 42 receives the annotation data from the annotation DB 40.

At step S410, the annotation label rearranging section 42 assigns the annotation data into data of a set of expected recognition target movement state classes and into data of an un-expected (miscellaneous-other) movement state. The annotation label rearranging section 42 generates annotation data of three patterns: recognition target classes and the miscellaneous-other class (two classes); recognition target movement state classes (N classes); and the miscellaneous-other class in addition to the movement state classes (N+1 classes). FIG. 10 illustrates an example of the plural patterns of annotation data generated by the current processing. The first annotation data has two classifications "miscellaneous-other" and "near miss", the second annotation data has classifications of the recognition target movement state classes such as "vehicle near miss" and "bicycle near miss", and the third annotation data has classifications of the miscellaneous-other class in addition to the movement state classes. In the second annotation data, a label for invalid data, such as blank text or NULL, is appended to data for a movement state class that is not a recognition target, such as miscellaneous-other.

At step S420, the annotation label rearranging section 42 passes the three rearranged patterns of annotation data to the movement state recognition multitask DNN model training section 46.

Figure 11:
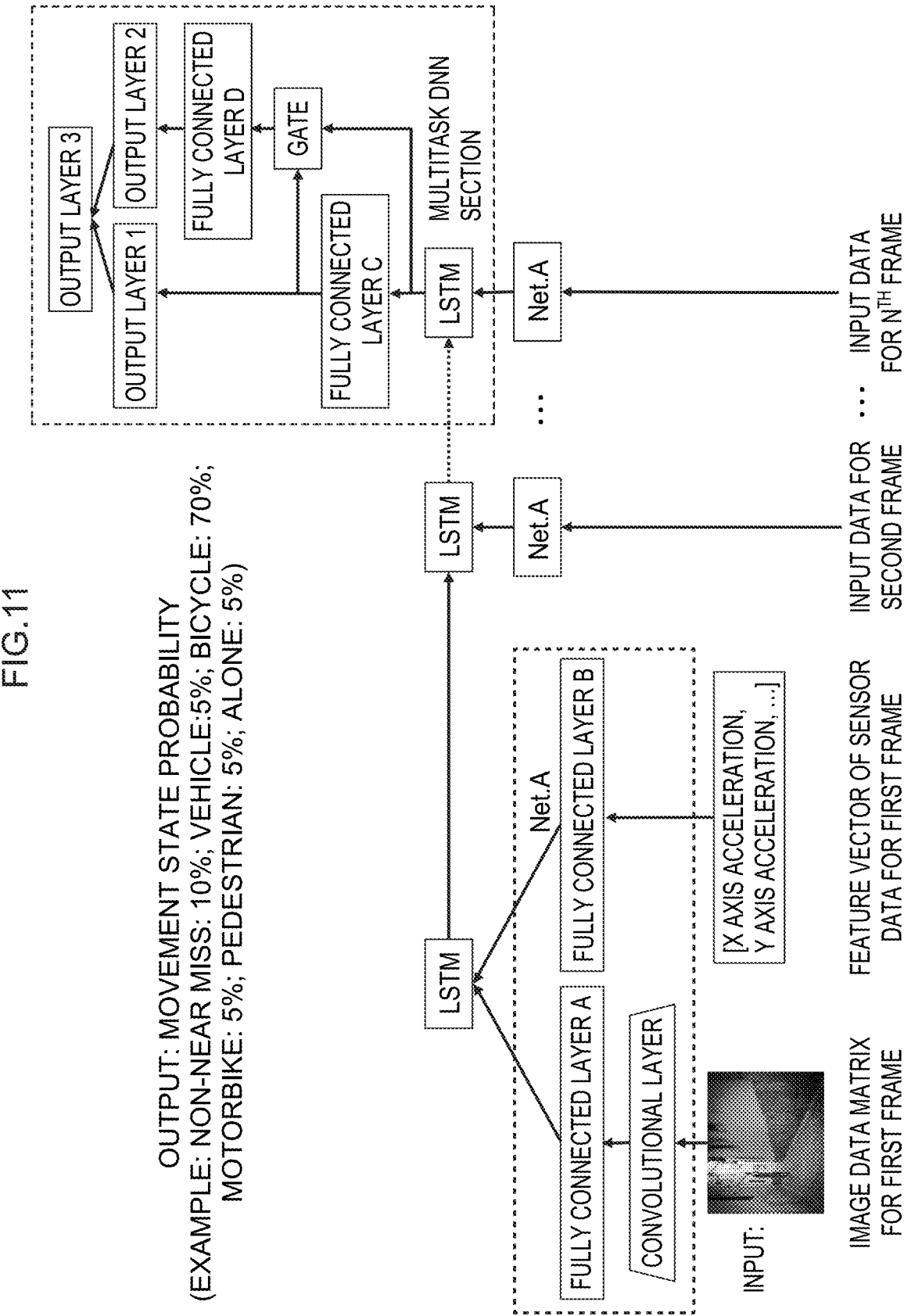
FIG. 11 is a diagram illustrating an example of a network structure of a DNN model.

FIG. 11 is an example of a DNN model network structure build by the movement state recognition multitask DNN model building section 44 in an exemplary embodiment of the present invention. A matrix to express image data of each frame in the video data, and associated sensor data feature vectors, are received as input, and respective movement state probabilities are obtained as output. The DNN model network structure is configured from the following units.

A first unit is a convolutional layer for extracting features from the matrices expressing the image data. This is performed by, for example, convoluting images with a 3×3 filter and extracting a maximum value within a specific rectangle (maximum pooling). A known network structure such as an AlexNet (see Krizhevsky, A., Sutskever, I., and Hinton, G. E.: ImageNet Classification with Deep Convolutional Neural Networks, pp. 1106 to 1114, 2012) may be utilized in the convolutional layer, and pre-trained parameters may be employed therein.

A second unit is a fully connected layer A that further abstracts features obtained from the convolutional layer. For example, a sigmoid function, a ReLu function, or the like may be utilized here, and input feature values subjected to non-linear transformation.

A third unit is a fully connected layer B that abstracts the feature vectors of the sensor data to an equivalent level to that of the image features. Similarly to the fully connected layer A, the input here is also subjected to non-linear transformation.

A fourth unit is a long-short-term-memory (LSTM) that further abstracts the two sets of abstracted features as series data. More specifically, series data are received sequentially, and non-linear transformation is repeatedly performed while circulating past abstracted information. For the LSTM, a known network structure installed with a forget gate may be utilized (Felix A. Gers, Nicol N. Schraudolph, and Jurgen Schmidhuber: Learning precise timing with LSTM recurrent networks. Journal of Machine Learning Research, vol. 3, pp. 115-143, 2002.).

A fifth unit is a fully connected layer C that reduces the abstracted series features down to a one-dimensional vector (scaler), and calculates a probability value a to determine whether or not a movement state is a target movement state. In order to be able to treat the calculated score as a probability value, a non-linear transformation such as a sigmoid function or the like is performed to express scores in a range of from 0 to 1. When the probability value a is high then this is taken as indicating a high probability of not being one of the target movement state classes (i.e. being "miscellaneous-other"), and when low this is taken as indicating that being one of the target movement states classes. The calculated probability value a is utilized in both a Gate unit and an output layer 1, described later.

The sixth unit is the output layer 1 for making associations or not to a target movement state class for the probability values a obtained from the fully connected layer C. For example, target movement state classes are associated with probability values a of less than 0.5 and output, and the miscellaneous-other movement state class is associated with probability values a or greater and output.

A seventh unit is the Gate unit that employs the series feature vector
h
abstracted as series data by the LSTM and employs the probability value a obtained by the fully connected layer C, to obtain a new
h' from $$h=(1-a)\cdot h$$

Moreover, in cases in which the movement state classes is a target movement state class (cases in which the probability value a obtained in a fully connected layer D is 0.0), then series feature vector
h
is kept at the same value and received in a fully connected layer D, described later, as
h'
and in cases outside the target movement state classes (cases in which the probability value a obtained in the fully connected layer D is 1.0), the series feature vector
h
is converted to 0 and received as
h'
by the fully connected layer D. The Gate unit accordingly functions to control the size of the series feature vector
h An eighth unit is the fully connected layer D that reduces the abstracted series features and
h'
obtained from the Gate unit down to a vector with a dimension of the number of types of the target movement state classes, and calculates a probability vector for each movement state. A softmax function or the like is utilized here to perform a non-linear transformation such that the sum of input feature quantities for all elements is 1.

A ninth unit is an output layer 2 that makes associations between the target movement state classes and the probability vectors for the probability vectors obtained from the fully connected layer D. For example, a first probability vector is associated with a vehicle near miss, a second is associated with a bicycle near miss, and the movement state class associated with the element having the maximum value from out of these probability vectors is output as the recognition result.

A tenth unit is an output layer 3 that catenates the vectors obtained from output layer 1 and from the output layer 2, and makes associations between the vectors and classes including the movement state classes and the additional miscellaneous-other class. For example, a first vector is associated with miscellaneous-other, a second vector with vehicle near miss, and a recognition result is output of the movement state class associated with the element having the maximum value.

Figure 12:
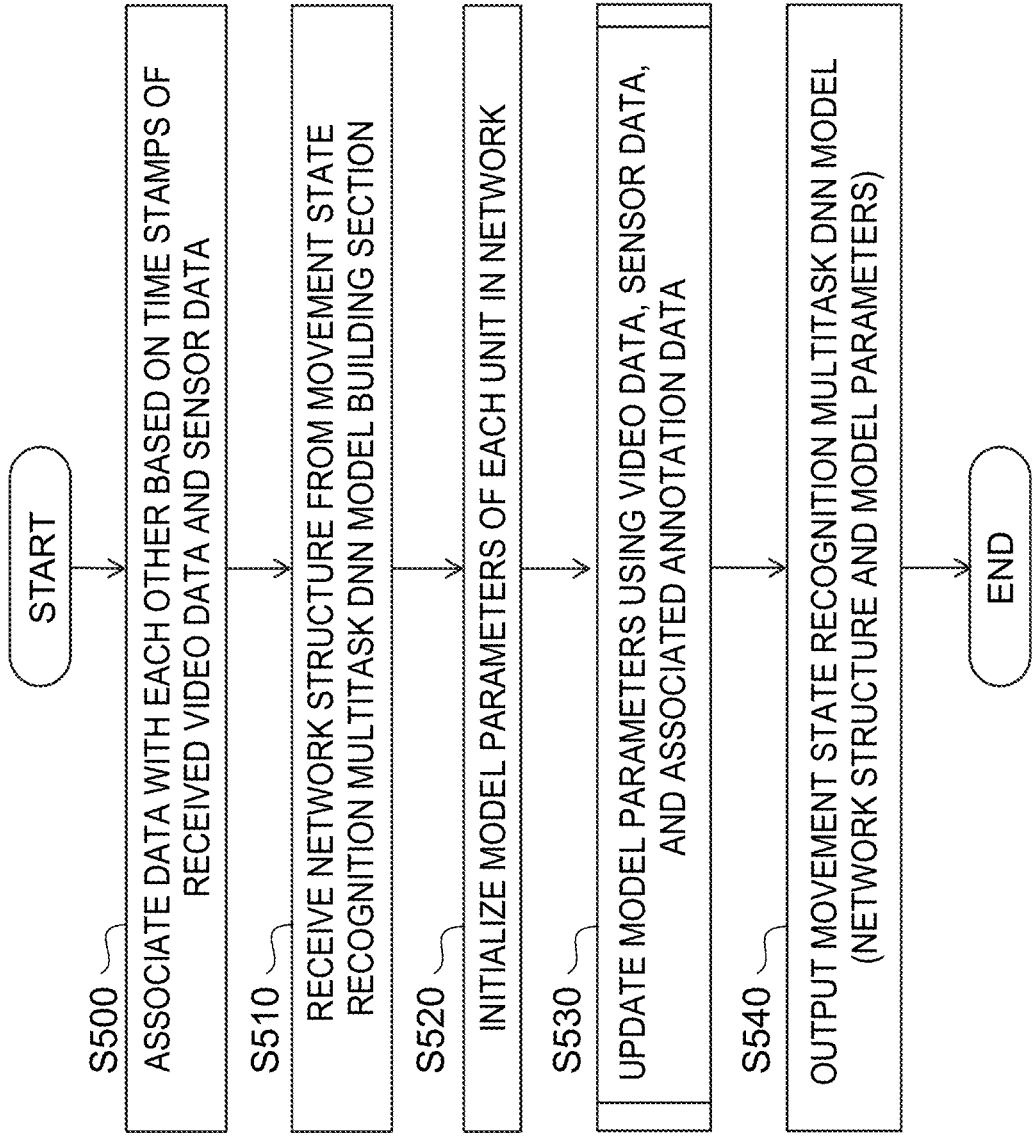
FIG. 12 is a flowchart illustrating a flow of processing of a movement state recognition multitask DNN model training section of a movement state recognition model training device according to an exemplary embodiment of the present invention.

FIG. 12 is a flowchart illustrating a sub-routine executed by the movement state recognition multitask DNN model training section 46 in order to implement step S140. More specific description of processing follows.

At step S500, the movement state recognition multitask DNN model training section 46 associates the video data with the sensor data based on the time stamp of the received video data and the date-time information of the sensor data.

At step S510, the movement state recognition multitask DNN model training section 46 receives from the movement state recognition multitask DNN model building section 44 the DNN model that has a network structure such as that illustrated in FIG. 11.

At step S520, the movement state recognition multitask DNN model training section 46 initializes the model parameters of each unit in the network structure. For example, initialization with a random number from 0 to 1.

At step S530, the movement state recognition multitask DNN model training section 46 updates the model parameters using the video data, the sensor data, and the corresponding annotation data. Details of this processing are described in model parameter update processing for the movement state recognition multitask DNN model as described later.

At step S540, the movement state recognition multitask DNN model training section 46 outputs the movement state recognition multitask DNN model (the network structure and the model parameters), and the output result is stored in the movement state recognition multitask DNN model DB 48. FIG. 14 illustrates an example of the model parameters. Parameters are stored as a matrices and vectors for each layer. Moreover, text regarding the movement state corresponding to each element number of the probability vector is stored for the output layers 1, 2, 3.

Figure 13:
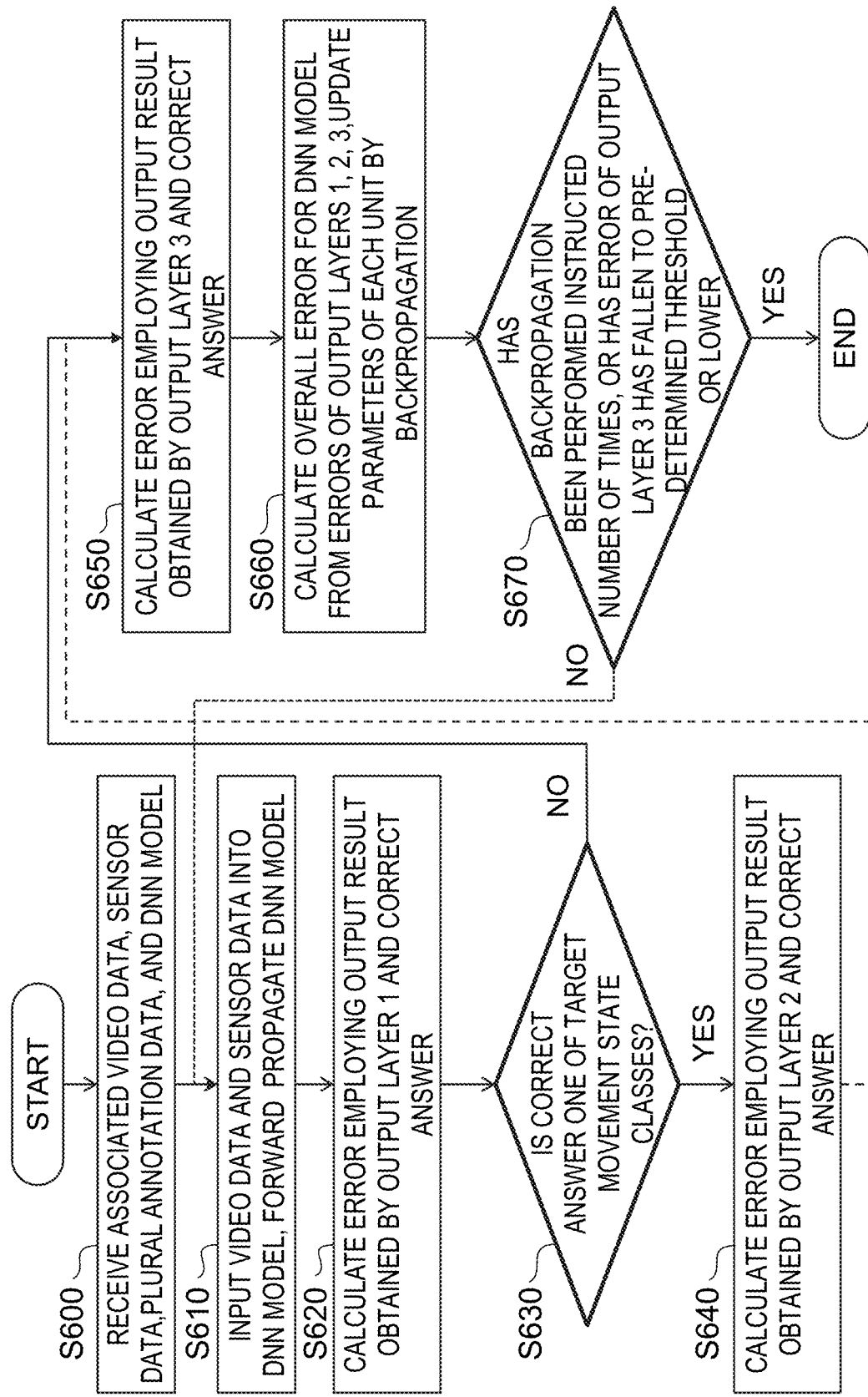
FIG. 13 is a flowchart illustrating a flow of model parameter update processing of a movement state recognition multitask DNN model training section of a movement state recognition model training device according to an exemplary embodiment of the present invention.

FIG. 13 is a flowchart illustrating a sub-routine executed by the movement state recognition multitask DNN model training section 46 in order to implement step S530. More specifically, the following processing is performed.

At step S600, the movement state recognition multitask DNN model training section 46 receives the associated video data, sensor data, plural annotation data, and the DNN model.

At step S610, the movement state recognition multitask DNN model training section 46 inputs the video data and the sensor data into the DNN model, and forward propagates the DNN model.

At step S620, the movement state recognition multitask DNN model training section 46 employs the output result obtained by the output layer 1 and a correct answer to calculate an error. When doing so, for example, the correct answer is either "miscellaneous-other" or "near miss" for the first annotation data of the annotation data of FIG. 10, and the cross entropy error to the binary vector correct answer is calculated.

If the correct answer is one of the target movement state classes, then an error calculation can be performed in the output layer 2 at step S630, and processing transitions to step S640. The error calculation by the output layer 2 is skipped in other cases, and processing transitions to step S650.

At step S640, the movement state recognition multitask DNN model training section 46 calculates an error using the output result obtained by the output layer 2 and the correct answer. When doing so, for example, the correct answer is one of the target movement state classes for the second annotation data of the annotation data of FIG. 10, such as "vehicle near miss", "bicycle near miss", etc., and the cross entropy error is calculated to the binary vector correct answer.

At step S650, the movement state recognition multitask DNN model training section 46 employs the output result obtained by the output layer 3 and the correct answer to calculate an error. When doing so, for example, the correct answer is one class out of the movement state classes to which the "miscellaneous-other" class has been added for the third annotation data of the annotation data of FIG. 10, such as "miscellaneous-other", "vehicle near miss", etc., and the cross entropy error is calculated to the binary vector correct answer.

At step S660, the movement state recognition multitask DNN model training section 46 calculates an overall error for the DNN model from the errors of the output layers 1, 2, 3, and updates the parameters of each of the units using a known method such as backpropagation. For example, an object function capable of multitask learning may be designed as $$L = \alpha \cdot L_1 = \beta \cdot L_2 + \gamma L_3$$

wherein: L is an object function to be minimized for the DNN model overall, $L_1$ is the error evaluated for the output layer 1, $L_2$ is the error evaluated for the output layer 2, and $L_3$ is the error evaluated for the output layer 3. $\alpha$, $\beta$, and $\gamma$, are each hyper-parameters determining respective weights for these errors and may be adjusted so as to minimize the error of the output layer 3.

At step S670, the movement state recognition multitask DNN model training section 46 ends the model parameter update processing after backpropagation has been performed the instructed number of times, or after the error of the output layer 3 has fallen to a pre-determined threshold or lower. In other cases the DNN model is treated as not yet optimized, and processing returns to step S610. Determination using the error of output layer 3 is made in order to discriminate as to whether or not the correct answer has been obtained correctly in the output layer 3 that is the final output of the DNN model overall.

Configuration of Movement State Recognition Device According to Exemplary Embodiment of Present Invention Next, description follows regarding a configuration of a movement state recognition device according to an exemplary embodiment of the present invention. As illustrated in FIG. 15, a movement state recognition device 100 according to an exemplary embodiment of the present invention includes an input section 120, a computation section 130, and an output section 150.

The input section 120 receives pairs of video data and sensor data time series for a user who is to be subjected to recognition.

The computation section 130 includes a video data pre-processing section 136, a sensor data pre-processing section 138, a movement state recognition section 140, and a movement state recognition multitask DNN model DB 148. The computation section 130 outputs a recognition result for the video data and sensor data received from the input section 120 using the output section 150.

In the exemplary embodiment of the present invention, the operations of the configuration elements illustrated in FIG. 15 are built as a program, and are executed by installing the program on a computer employed as the movement state recognition device.

The movement state recognition multitask DNN model DB 148 is stored with the model parameters for the same DNN model as the movement state recognition multitask DNN model DB 48.

The video data pre-processing section 136 performs sampling and normalization on the image data time series expressing the video data received by the input section 120, similarly to the video data pre-processing section 36.

The sensor data pre-processing section 138 performs normalization and feature vectorization on sensor data time series received by the input section 120, similarly to the sensor data pre-processing section 38.

Based on the image data time series that is the processing result of the video data pre-processing section 136, the sensor data time series that is the processing result of the sensor data pre-processing section 138, and the model parameters stored in the movement state recognition multitask DNN model DB 148, the movement state recognition section 140 inputs the image data time series and the sensor data time series to the DNN model, and recognizes the movement state of the user subjected to recognition.

Similarly to the movement state recognition model training device 10, the movement state recognition device 100 is, as an example, implemented by the computer 84 illustrated in FIG. 1B. The program 82 to cause the computer 84 to function as the movement state recognition device 100 is stored in the storage section 92.

Figure 16:
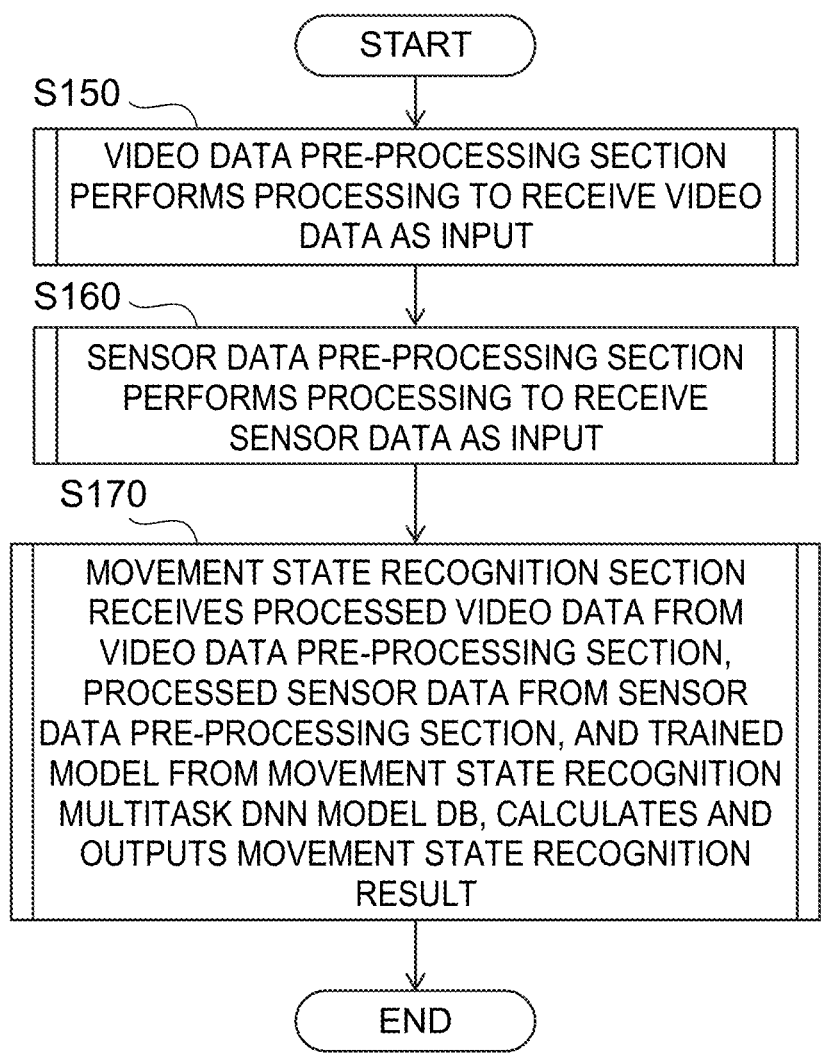
FIG. 16 is a flowchart illustrating a flow of processing of a movement state recognition device according to an exemplary embodiment of the present invention.

Operation of Movement State Recognition Device According to Exemplary Embodiment of Present Invention FIG. 16 is a flowchart of a movement state recognition processing routine executed by the movement state recognition device 100 in an exemplary embodiment of the present invention. Specific description follows.

Movement State Recognition Processing Routine

First, the DNN model (network structure and model parameters) output by the movement state recognition model training device 10 is input to the movement state recognition device 100, and the input DNN model is stored by the movement state recognition device 100 in the movement state recognition multitask DNN model DB 148. The movement state recognition device 100 then executes the following processing when input with pairs of video data series and sensor data time series.

At step S150, the video data pre-processing section 136 performs processing to receive the video data as input. Step S150 is implemented by a flowchart similar to the flowchart of FIG. 6.

At step S160, the sensor data pre-processing section 138 performs processing to receive the sensor data as input. This is implemented by a flowchart similar to the flowchart of FIG. 8.

At step S170, the movement state recognition section 140 receives the processed video data from the video data pre-processing section 136, the processed sensor data from the sensor data pre-processing section 138, and the trained DNN model from the movement state recognition multitask DNN model DB 148, calculates a movement state recognition result, and outputs this using the output section 150.

Figure 17:
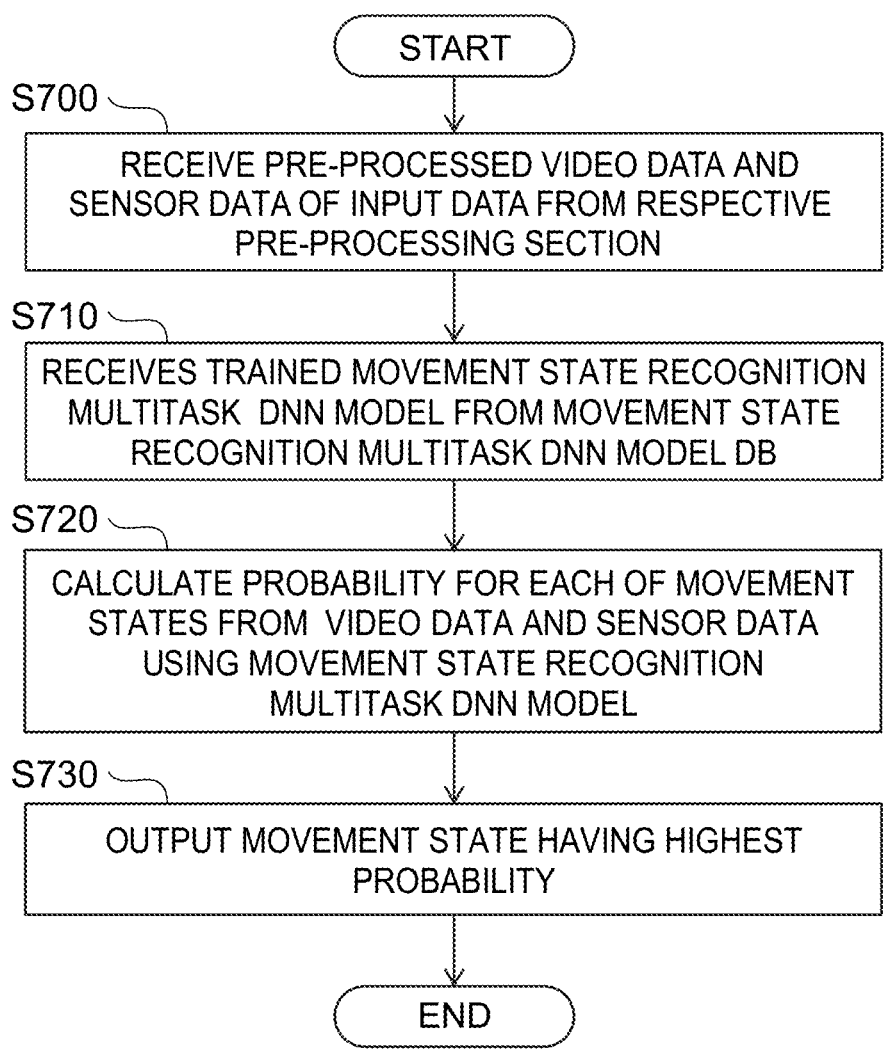
FIG. 17 is a flowchart illustrating a flow of processing of a movement state recognition section of a movement state recognition device according to an exemplary embodiment of the present invention.

FIG. 17 is a flowchart illustrating a sub-routine executed by the movement state recognition section 140 in order to implement step S170. Specific description follows.

At step S700, the movement state recognition section 140 receives the pre-processed video data and sensor data time series of input date from the video data pre-processing section 136 and the sensor data pre-processing section 138.

At step S710, the movement state recognition section 140 receives the trained DNN model (network structure and model parameters) from the movement state recognition multitask DNN model DB 148.

At step S720, the movement state recognition section 140 inputs the video data and sensor data time series to the DNN model, and calculates a probability for each of the movement states from the video data and sensor data time series by forward propagating the DNN model.

At step S730, the movement state recognition section 140 outputs the movement state having the highest probability as a movement state recognition result using the output section 150.

FIG. 18 is a flowchart of forward propagation in a multitask DNN section for implementing steps S610, S720 as an example of a structure of the DNN model illustrated in FIG. 9. Specifically, the following processing is performed.

At step S800, the multitask DNN section receives from the LSTM a series feature vector
h
obtained by considering at the same time the feature vector obtained by the latest forward propagation of the image data and sensor data, and the feature vector from the previous time.

At step S810, the multitask DNN section obtains a probability value a that is a one-dimensional vector (scaler) obtained by the fully connected layer C performing feature transformation and non-linear transformation with a sigmoid function on the series feature vector
h. The probability value a is passed to both the Gate unit and the output layer 1.

At step S820, the multitask DNN section uses the series feature vector
h
and the probability value a obtained from the fully connected layer C to obtain
h'
from $$h'=(1-a)\cdot h$$

with the Gate unit.

At step S830, the multitask DNN section obtains the feature vector
$h_2$
by the fully connected layer D performing feature transformation of the feature vector
h'
into a vector of dimension that is the number types of target movement state classes and by performing a non-linear transformation utilizing a softmax function or the like. This value is passed to the output layer 2.

At step S840, the multitask DNN section catenates the probability value a, a scaler obtained from the output layer 1, with the feature vector
$h_2$
obtained from the output layer 2, to obtain a feature vector $$h_3=[a|h_2]$$

This feature vector is passed to the output layer 3.

As described above, the movement state recognition model training device according to the exemplary embodiment of the present invention trains the parameters of the DNN model based on the image data time series and the sensor data time series, and on the first annotation data, the second annotation data, and the third annotation data generated for the image data time series and the sensor data time series. When doing so, the movement state recognition model training device trains the parameters of the DNN model such that the movement state recognized by the DNN model in a case in which input with the image data time series and the sensor data time series, matches the movement states indicated by the first annotation data, the second annotation data, and the third annotation data. Information is thereby efficiently extracted and combined from both video data and sensor data, and also movement state recognition can be implemented at high precision for a data set including data to which none of the movement state classes applies.

Moreover, a DNN model utilizing video data in addition to sensor data is built and trained, and utilizing the DNN model obtained thereby in movement state recognition enables recognition of movement states of a user that hitherto have been unrecognizable.

Moreover, the DNN model for movement state recognition, which is equipped with the convolutional layer able to handle image features effectively for user state recognition, a fully connected layer capable of abstracting features at an appropriate level of abstraction, and an LSTM capable of efficiently abstracting series data, enables user movement states to be recognized with high precision.

Moreover, even when unexpected data is input, this can be assigned to the "miscellaneous-other" class or the like by treating movement state data that is not a recognition target as a single class.

Moreover, evaluating the error for the movement state class of non-recognition targets using a separate output layer enables movement state recognition to be performed at high precision for every class without greatly affecting the classification model for the movement state classes that are recognition targets.

Moreover, the model can be made lighter than in a method in which two classifiers are prepared, i.e. a classifier for classifying into movement state classes that are recognition targets and a miscellaneous-other class, and a classifier for classifying the movement state classes that are recognition targets.

Moreover, the video data pre-processing section is able to perform pre-processing so as to make the video data easier for the DNN model to handle by performing pre-processing on the video data, such as sampling, normalization, etc. Moreover, the sensor data pre-processing section is able to perform pre-processing so as to make the sensor data easier for the DNN model to handle by performing pre-processing on the sensor data, such as normalization, feature vectorization, and the like.

Moreover, the DNN model is rendered capable of multi-task learning by the annotation label rearranging section generating annotation data in plural patterns from single annotation data.

The movement state recognition multitask DNN model training section uses a result obtained by a given fully connected layer as a variable in a Gate to affect a prediction result of a separate output layer. As in the example illustrated in FIG. 11, if estimated to be in a target movement state class, then the Gate passes this result as an unmodified value to the fully connected layer D. Moreover, if estimated to not be in a target movement state class, then the Gate passes a value approaching 0 to the fully connected layer D. As a result, the need to calculate errors for cases not in a target movement state class in the output layer 2 is eliminated, and the output obtained by the output layer 3 directly reflects the result obtained by the output layer 1.

The movement state recognition multitask DNN model training section holds a combined error of the errors obtained from the plural output layers in an object function, and, by minimizing the object function that combines the plural errors, a DNN model suitable for multitasking achieved by the plural output layers is built, and a highly generalized DNN model is obtained.

Moreover, the movement state recognition device according to the exemplary embodiment of the present invention is able to implement movement state recognition with high precision from both video data and sensor data by employing the DNN model trained by the movement state recognition model training device.

Note that the present invention is not limited to the exemplary embodiment described above, and various modifications and applications are possible within a scope not departing from the spirit of the invention.

For example, although an example has been described of a case in which the movement state recognition model training device and the movement state recognition device are configured by separate devices, there is no limitation thereto, and the movement state recognition model training device and the movement state recognition device may be configured by a single device.

Moreover, although an example has been described of a case in which movement states of a user are recognized, there is no limitation thereto, and movement states of a moving body other than a user may be recognized.

Moreover, although the movement state recognition model training device and the movement state recognition device described above have an internal computer system, such a "computer system" also includes a home page provision environment (or display environment) for cases in which a WWW system is utilized.

Moreover, although in the present application specification exemplary embodiments have been described in which a program is pre-installed, such a program may be provided stored on a hard disk or on a portable storage medium such as a flexible disk, CD-ROM, or the like. Moreover, such a program may be distributed over a network.

The entire content of the disclosure of Japanese Patent Application No. 2018-085126 is incorporated by reference in the present specification.

All publications, patent applications and technical standards mentioned in the present specification are incorporated by reference in the present specification to the same extent as if each individual publication, patent application, or technical standard was specifically and individually indicated to be incorporated by reference.

The invention claimed is:

1. A movement state recognition model training device configured to train a deep neural network (DNN) model that is input with a time series of image data of a camera mounted to a moving body and a time series of sensor data of a sensor mounted to the moving body, that extracts respective image data features and respective sensor data features, and that recognizes a movement state of the moving body from data abstracted from the respective image data features and the respective sensor data features, the movement state recognition model training device comprising:
 a memory; and
 a processor that is coupled to the memory and that is configured to:
  generate first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, based on annotation data indicating a pre-appended movement state for the image data time series and the sensor data time series; and
  train a parameter of the DNN model based on the image data time series and the sensor data time series and on the first annotation data, the second annotation data, and the third annotation data generated for the image data time series and the sensor data time series, by training the DNN model such that a movement state recognized by the DNN model in a case in which input with the image data time series and the sensor data time series matches movement states indicated by the first annotation data, the second annotation data, and the third annotation data.

2. The movement state recognition model training device of claim 1, wherein:
 the DNN model includes an output layer to output a recognition result indicating whether or not the movement state of the moving body corresponds to one of the plurality of movement state classes, an output layer to output a recognition result indicating which of the plurality of movement state classes corresponds to the movement state of the moving body, and an output layer to output a recognition result indicating which of the plurality of predetermined movement state classes and the miscellaneous-other movement state class corresponds to the movement state of the moving body; and
 the processor is further configured to train the parameter of the DNN model such that a recognition result output by each output layer of the DNN model matches movement states indicated by the first annotation data, the second annotation data, and the third annotation data.

3. A movement state recognition device comprising:
 a memory; and a processor that is coupled to the memory and that is configured to:
  recognize a movement state of a moving body of a recognition subject by inputting a time series of image data of a camera mounted to the moving body and a time series of sensor data of a sensor mounted to the moving body into a deep neural network (DNN) model that has been pre-trained to use the image data time series and the sensor data time series as input, to extract respective image data features and respective sensor data features, and to recognize a movement state of the moving body from data abstracted from the respective image data features and the respective sensor data features,
  wherein the DNN model is pre-trained based on first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, that are generated from annotation data indicating a pre-appended movement state for the image data time series and the sensor data time series, and based on the image data time series and the sensor data time series, by training the DNN model such that a movement state recognized by the DNN model in a case in which input with the image data time series and the sensor data time series matches movement states indicated by the first annotation data, the second annotation data, and the third annotation data.

4. A movement state recognition model training method for training a deep neural network (DNN) model that is input with a time series of image data of a camera mounted to a moving body and a time series of sensor data of a sensor mounted to the moving body, that extracts respective image data features and respective sensor data features, and that recognizes a movement state of the moving body from data abstracted from the respective image data features and the respective sensor data features, the movement state recognition model training method comprising:
  by a computer,
  generating first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, based on annotation data indicating a pre-appended movement state for the image data time series and the sensor data time series; and
  training a parameter of the DNN model based on the image data time series and the sensor data time series and on the first annotation data, the second annotation data, and the third annotation data generated for the image data time series and the sensor data time series, by training the DNN model such that a movement state recognized by the DNN model in a case in which input with the image data time series and the sensor data time series matches movement states indicated by the first annotation data, the second annotation data, and the third annotation data.

5. A movement state recognition method for recognizing a movement state of a moving body of a recognition subject by a computer inputting a time series of image data of a camera mounted to the moving body and a time series of sensor data of a sensor mounted to the moving body into a deep neural network (DNN) model that has been pre-trained to use the image data time series and the sensor data time series as input, to extract respective image data features and respective sensor data features, and to recognize a movement state of the moving body from data abstracted from the respective image data features and the respective sensor data features, the movement state recognition method comprising:
  pre-training the DNN model based on first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, that are generated from annotation data indicating a pre-appended movement state for the image data time series and the sensor data time series, and based on the image data time series and the sensor data time series, by training the DNN model such that a movement state recognized by the DNN model in a case in which input with the image data time series and the sensor data time series matches movement states indicated by the first annotation data, the second annotation data, and the third annotation data.

6. A non-transitory computer readable medium storing a program executable by a computer to perform a process for training a deep neural network (DNN) model that is input with a time series of image data of a camera mounted to a moving body and a time series of sensor data of a sensor mounted to the moving body, that extracts respective image data features and respective sensor data features, and that recognizes a movement state of the moving body from data abstracted from the respective image data features and the respective sensor data features, the process comprising:
  generating first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, based on annotation data indicating a pre-appended movement state for the image data time series and the sensor data time series; and
  training a parameter of the DNN model based on the image data time series and the sensor data time series and on the first annotation data, the second annotation data, and the third annotation data generated for the image data time series and the sensor data time series, by training the DNN model such that a movement state recognized by the DNN model in a case in which input with the image data time series and the sensor data time series matches movement states indicated by the first annotation data, the second annotation data, and the third annotation data.

7. A non-transitory computer readable medium storing a program executable by a computer to perform a process for movement state recognition processing, the process comprising:

recognizing a movement state of a moving body of a recognition subject by inputting a time series of image data of a camera mounted to the moving body and a time series of sensor data of a sensor mounted to the moving body into a deep neural network (DNN) model that has been pre-trained to use the image data time series and the sensor data time series as input, to extract respective image data features and respective sensor data features, and to recognize a movement state of the moving body from data abstracted from the respective image data features and the respective sensor data features, wherein the DNN model is pre-trained based on first annotation data indicating whether or not the movement state of the moving body corresponds to any of a plurality of predetermined movement state classes, second annotation data indicating which of the plurality of predetermined movement state classes corresponds to the movement state of the moving body, and third annotation data indicating which of the plurality of predetermined movement state classes and a miscellaneous-other movement state class corresponds to the movement state of the moving body, that are generated from annotation data indicating a pre-appended movement state for the image data time series and the sensor data time series, and based on the image data time series and the sensor data time series, by training the DNN model such that a movement state recognized by the DNN model in a case in which input with the image data time series and the sensor data time series matches movement states indicated by the first annotation data, the second annotation data, and the third annotation data.

* * * * *